US008628253B2

(12) United States Patent
Bitter et al.

(10) Patent No.: US 8,628,253 B2
(45) Date of Patent: Jan. 14, 2014

(54) OPTICAL CONNECTOR THAT COMPENSATES FOR LONGITUDINAL SHIFTING OF OPTIAL FIBER CORE RELATIVE TO A HOUSING OF THE CONNECTOR, AND A METHOD

(75) Inventors: Tobias Bitter, Regensburg (DE); Frank Weberpals, Regenstauf (DE); Josef Wittl, Parsberg (DE)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 294 days.

(21) Appl. No.: 13/116,051

(22) Filed: May 26, 2011

(65) Prior Publication Data

US 2012/0301082 A1  Nov. 29, 2012

(51) Int. Cl.
*G02B 6/36* (2006.01)
*G02B 6/38* (2006.01)

(52) U.S. Cl.
USPC .............. 385/66; 385/72; 385/75; 385/84

(58) Field of Classification Search
USPC ............................. 385/66, 72, 75, 84
See application file for complete search history.

(56) References Cited

U.S. PATENT DOCUMENTS

| 4,828,353 | A | * | 5/1989 | Yamaguchi et al. | 385/58 |
| 5,621,835 | A | | 4/1997 | Takahashi et al. | |
| 6,842,574 | B1 | | 1/2005 | Horn et al. | |
| 7,572,064 | B2 | * | 8/2009 | deJong | 385/65 |

FOREIGN PATENT DOCUMENTS

| JP | 10031139 A | 2/1998 |
| JP | 2006201469 A | 8/2006 |

OTHER PUBLICATIONS

Claudio Meisser; Automatische Verarbeitung von POF Leitungen; Komax: 1.7.2002; pp. 1-30; Muchen.
Andreas Engel; Optical Interconnection Systems from Tyco Electronics; Components for the MOST Network; Tyco Electronics; May 2000.
"Active Alignment Process Reduces Fiber-Core Offsets"; By Marc Graf, Published in Laser Focus World, Jul. 1996 Edition; http://www.diamond-fo.com/media/library/docs/ACA_Advertisement.pdf.
"Yazaki Optical Network Technology" Presentation; Presented At MOST Interconnectivity Conference, Japan, Jun. 2000.

* cited by examiner

*Primary Examiner* — Jerry Rahll (57) ABSTRACT

An optical connector is provided having a housing with a cavity formed therein through which an optical fiber passes. Within the cavity, a slightly bent, unjacketed portion of the core of the optical fiber is disposed. If conditions are such that pistoning of the core begins to occur, the slightly bent, unjacketed portion of the core straightens, thereby causing the end of the core to remain substantially flush with the end of the ferrule of the connector housing. In this way, the pistoning effect at the end of the fiber is prevented and optical losses associated with the occurrence of the pistoning effect are avoided.

20 Claims, 7 Drawing Sheets

OPTICAL CONNECTOR THAT COMPENSATES FOR LONGITUDINAL SHIFTING OF OPTIAL FIBER CORE RELATIVE TO A HOUSING OF THE CONNECTOR, AND A METHOD

TECHNICAL FIELD OF THE INVENTION

The invention relates to optical connectors. More particularly, the invention relates to an optical connector that compensates for longitudinal shifting of an optical fiber core of an optical fiber relative to a housing of the optical connector.

BACKGROUND OF THE INVENTION

A variety of optical connectors are used in the optical communications industry to mechanically and optically couple an end of an optical fiber cable to an optical fiber receptacle. In general, an optical connector includes a connector housing that is mechanically coupled to at least one optical fiber. The connector housing includes a ferrule that receives and surrounds a portion of the optical fiber adjacent an end of the optical fiber. The optical fiber comprises a fiber core, a cladding that surrounds the core, and a jacket that surrounds the cladding.

Figure 1A:
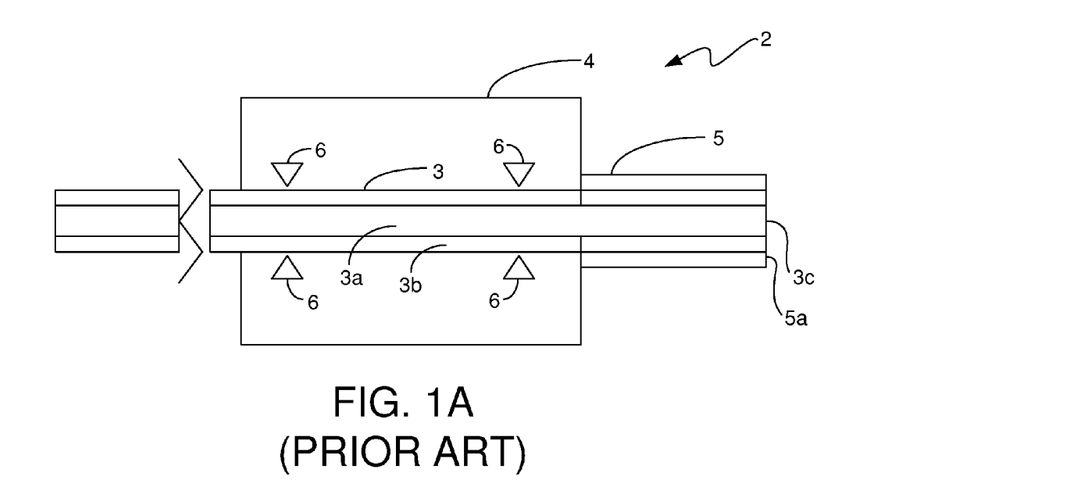
FIGS. 1A and 1B illustrate side views of a known optical connector coupled with an optical fiber.
Figure 1B:
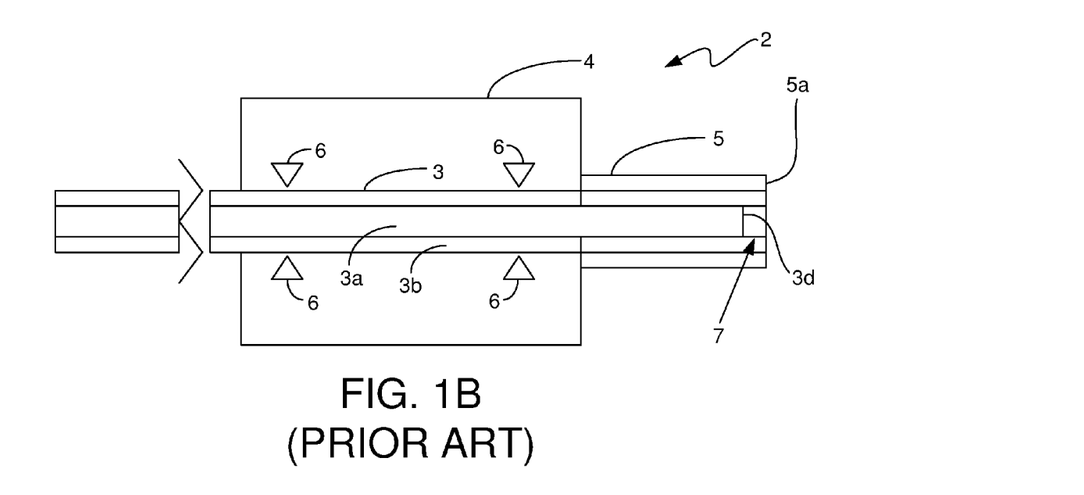

FIGS. 1A and 1B illustrate side views of a known optical connector 2 coupled with an optical fiber 3. The optical connector 2 includes a connector housing 4 and a ferrule 5. A portion of the optical fiber 3 is held within the optical connector 2. The optical fiber 3 has a core 3a and a jacket 3b that surrounds the core 3a. For ease of illustration, the cladding is not shown in FIGS. 1A and 1B. In FIGS. 1A and 1B, reference numeral 3a represents the core and the cladding. An end portion of the optical fiber 3 is disposed within the ferrule 5 such that an end 3c of the fiber 3 is flush with an end 5a of the ferrule 5. The end 3c of the fiber 3 is made flush with the end 5a of the ferrule 5 via a polishing process or similar processes. Clamps 6 are used to clamp down on the fiber 3 to hold it in position within the connector housing 4.

One of the problems with optical connectors of the type shown in FIG. 1A occurs at the end 3c of the fiber 3, as will now be described with reference to FIG. 1B. After the optical fiber 3 has been cut and installed in the connector housing 4 as shown in FIG. 1A, temperature and humidity conditions cause the core 3a to shrink and retract away from the end 5a of the ferrule 5 leaving a gap 7 between the end 3c of the core 3a and the end 5a of the ferrule 5. The jacket 3b does not shrink to the same extent as the core 3a due to differences in surface tension, intrinsic tension, and in the coefficients of thermal expansion of the core 3a and the jacket 3b. Because of the gap 7, light passing out of the end 3c of the core 3a reflects off of the jacket 3b, thereby resulting in optical losses. This is sometimes referred to in the optical communications industry as "the pistoning effect."

One technique that is sometimes used to avoid the pistoning effect involves the use of a special optical fiber that is designed to prevent pistoning from occurring. The optical fiber that is developed for this purpose has a second, outer jacket (not shown) that surrounds the jacket 3b. The jacket 3b becomes a first, inner jacket that is secured to the core 3a (e.g., by an adhesive material) to prevent the core 3a from "pistoning" relative to the jacket 3b. The second, outer jacket is only loosely connected to the first, inner jacket 3b. With this design, pistoning of the core 3a within the first, inner jacket 3b is prevented. Other techniques that involve glue or welding have also been used to prevent the pistoning effect.

Developing a special optical fiber that prevents pistoning from occurring is relatively costly and increases the overall cost of the optical link. Currently, if a special optical fiber is not used, then the optical link must be designed with sufficient margin to overcome the optical losses that occur due to the pistoning effect, which also increases the overall cost of the optical link.

SUMMARY OF THE INVENTION

The invention provides an optical connector and a method for preventing the pistoning effect from occurring. The optical connector comprises a connector housing and an optical fiber. The connector housing has at least a first end, a second end, and a ferrule. The ferrule has a first end that is secured to the second end of the connector housing. A cavity is located in the connector housing between the first and second ends of the connector housing. The optical fiber has a first end that is disposed within the ferrule and located proximate the second end of the ferrule. The optical fiber has a core and at least one jacket. The jacket surrounds the core. A portion of the optical fiber is disposed within the cavity. The portion of the optical fiber that is disposed within the cavity has the jacket removed and is bent by a predetermined amount to have a predetermined bend radius within the cavity.

The method comprises providing a connector housing, providing an optical fiber having a portion that is disposed in the connector housing, and bending a portion of the optical fiber that is disposed within a cavity of the connector housing by a predetermined amount to have a predetermined bend radius within the cavity.

These and other features and advantages of the invention will become apparent from the following description, drawings and claims.

DETAILED DESCRIPTION OF AN ILLUSTRATIVE EMBODIMENT

In accordance with embodiments of the invention, the housing of the optical connector has a cavity formed therein through which the optical fiber passes. Within the cavity, a slightly bent, unjacketed, portion of the core of the optical fiber is disposed. If the pistoning effect starts to occur, the slightly bent portion of the core straightens, thereby causing the end of the core to remain substantially flush with the end of the ferrule of the connector housing. In this way, the pistoning effect is prevented and optical losses associated with the occurrence of the pistoning effect are avoided. Illustrative, or exemplary, embodiments of the optical connector will now be described with reference to FIGS. 2A-7C. Like reference numerals in the figures represent like elements or features.

Figure 2A:
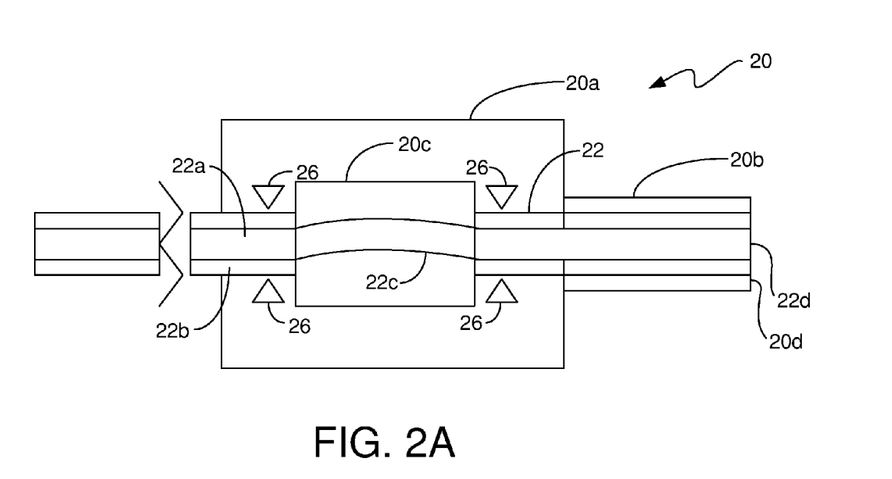
FIGS. 2A and 2B illustrate side views of an illustrative embodiment of the optical connector coupled with an optical fiber and designed to prevent pistoning from occurring.
Figure 2B:
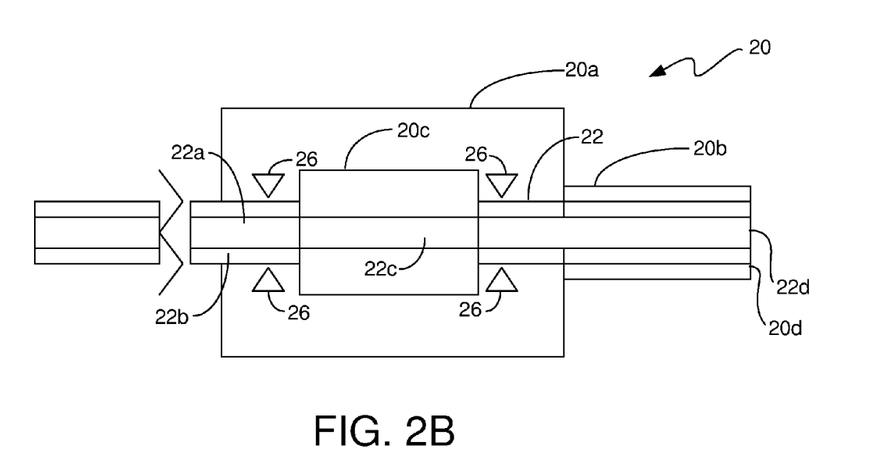

FIGS. 2A and 2B illustrate side views of an illustrative embodiment of the optical connector 20 coupled with an optical fiber 22. The optical connector 20 includes a connector housing 20a and a ferrule 20b. The optical fiber 22 has a core 22a and a jacket 22b surrounding the core 22a. For ease of illustration, the cladding of the optical fiber 22 is not shown in FIGS. 2A and 2B. In FIGS. 2A and 2B, reference numeral 22a represents the core surrounded by the cladding. The connector housing 20a has a cavity 20c formed therein in which an unjacketed, bent portion 22c of the core 22a is disposed. An end 22d of the fiber 22 is flush with an end 20d of the ferrule 20b. The end 22d of the fiber 22 is made flush with the end 20d of the ferrule 20b via a known polishing process or similar process. Clamps 26 are used to clamp the fiber 22 in position within the connector housing 20a.

As can be seen in FIG. 2A, although the bent unjacketed, bent portion 22c of the core 22a is disposed within the cavity 20c, the end 22d of the optical fiber 22 is flush with the end 20c of the ferrule 20b. Thus, the length of the optical fiber 22 that is disposed within the connector housing 20a is longer than the length of the optical fiber 3 that is disposed within the connector housing 4 shown in FIGS. 1A and 1B, assuming that the outer dimensions of the connector housing 4 and of the ferrule 5 are the same as the outer dimensions of the connector housing 20a and the ferrule 20b. This longer length of the optical fiber 22 that is disposed within the connector housing 20a and ferrule 20b compensates for the pistoning effect, as will now be described with reference to FIG. 2B.

As shown in FIG. 2B, if the pistoning effect starts to occur, the unjacketed, bent portion 22c of the core 22a that is disposed within the cavity 20c will straighten to remove the bend, as shown in FIG. 2B. This straightening of the core 22a causes the end 22d of the fiber 22 to remain flush with the end 20d of the ferrule 20b, which prevents the gap 7 shown in FIG. 1B from forming. This feature of the invention prevents optical losses due to the pistoning effect from occurring, which reduces costs associated with the optical link while improving the performance of the optical link.

Figure 3:
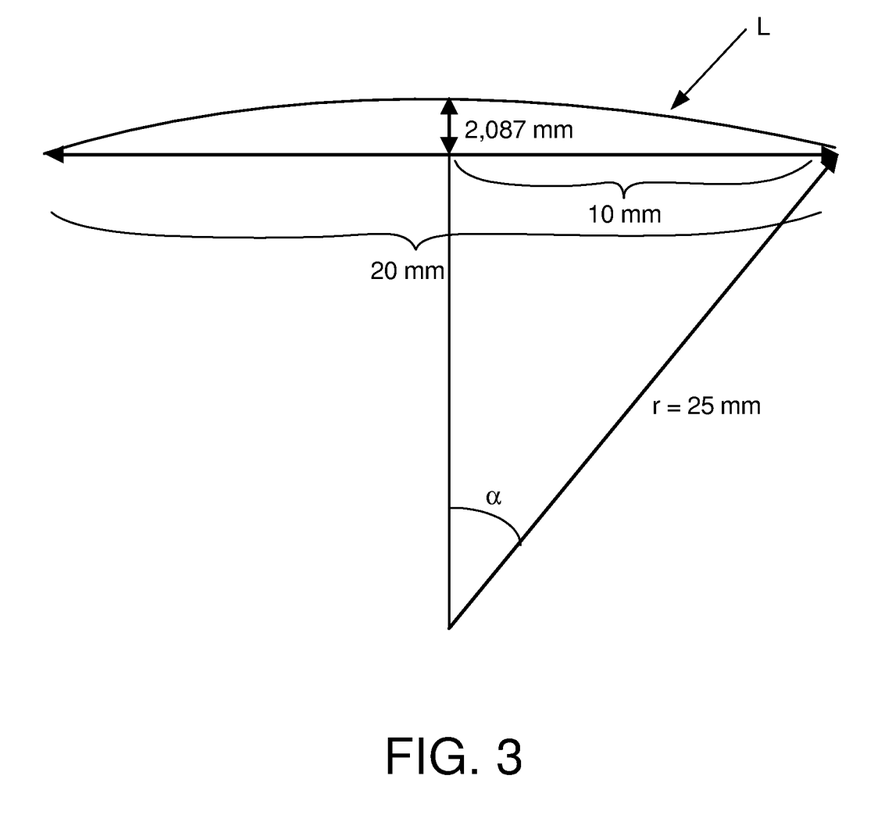
FIG. 3 is a diagram demonstrating the manner for calculating an amount of bend to be formed in the portion of the core of the optical fiber disposed within the cavity of the connector housing shown in FIGS. 2A and 2B.

FIG. 3 is a diagram demonstrating the manner in which an amount of bend to be formed in the portion 22c of the core 22a of the optical fiber 22 can be easily calculated. With reference to FIG. 1B, the distance of the end 3c of the core 3a from the end 5a of the ferrule 5 caused by the occurrence of the pistoning effect is known. Based on this value and a few other known or assumed values, the extent to which the core 22a should be bent to form the bent portion 22c can be determined by the following equation: $L=(2\times\alpha)/360°\times 2\pi r$, where L is the length of the bent portion 22c, $\alpha$ is the angle shown in FIG. 3, r is the bend radius shown in FIG. 3, and $\pi$ is a constant having a value of 3.14159. For example, using the diagram depicted in FIG. 3, which represents the portion 22c of the core 22a disposed within the cavity 20c, if a 20 millimeter (mm) length of the fiber 22 disposed within the cavity 20c is bent with a radius of 25 mm, then the dislocation of the fiber 22 is approximately 2,078 mm and the length difference compared to the unbent fiber 22 is 576 micrometers (µm). Of course, the bend radius should not be less than the minimum allowable bend radius for the optical fiber 22.

The unjacketed, bent portion 22c may be formed in a variety of ways using a variety of devices. A few examples of devices and techniques that may be used to form the unjacketed, bent portion 22c will now be described with reference to FIGS. 4A-7C. It should be noted, however, that the invention is not limited to any particular device or technique for forming the unjacketed, bent portion 22c.

Figure 4A:
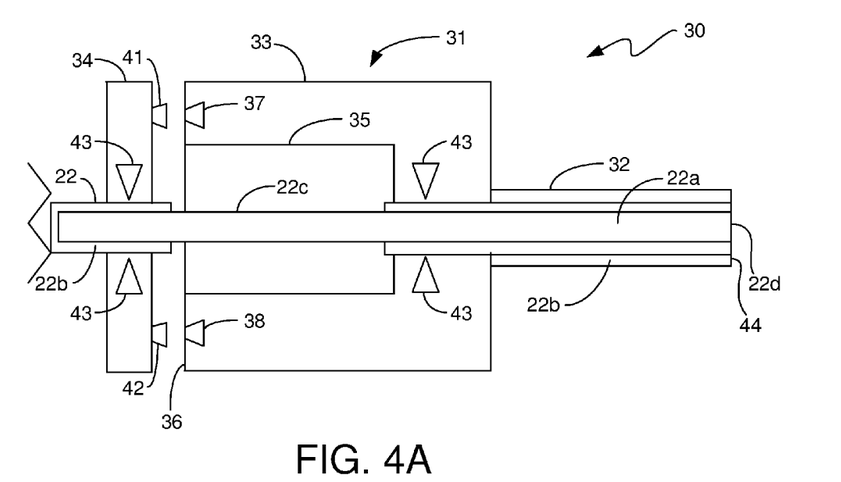
FIGS. 4A and 4B illustrate side cross-sectional views of the optical connector in accordance with an illustrative embodiment having a configuration that forms the bend in the optical fiber when the optical connector is assembled.
Figure 4B:
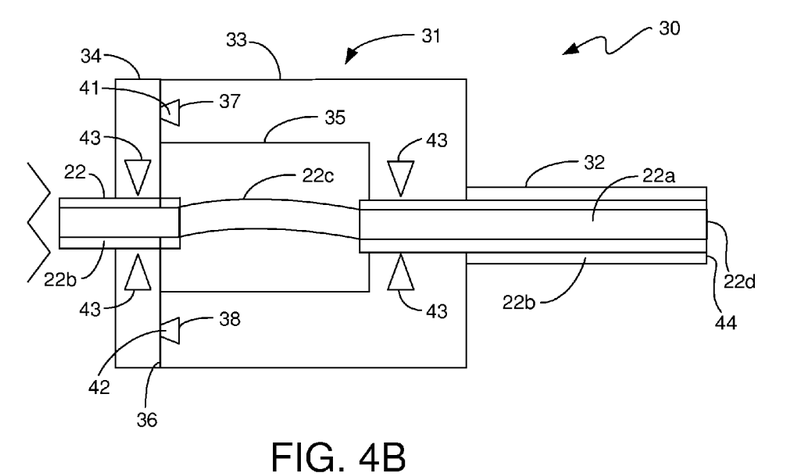

FIGS. 4A and 4B illustrate side cross-sectional views of the optical connector 30 in accordance with an illustrative embodiment having a configuration that forms the bent portion 22c when the optical connector 30 is assembled. The optical connector 30 has a connector housing 31 and a ferrule 32. The connector housing 31 has a first housing portion 33 and a second housing portion 34. A cavity 35 exists in the first housing portion 33. An end 36 of the first housing portion 33 that is opposite the ferrule 32 has mating features 37 and 38 formed therein. The second housing portion 34 has mating features 41 and 42 formed thereon.

The optical fiber 22 passes through the first and second housing portions 33 and 34 and is secured to the first and second housing portions 33 and 34 by clamps 43 such that the end 22d of the fiber 22 is substantially flush with the end 44 of the ferrule 32. In FIG. 4A, the first and second housing portions 33 and 34 are shown disconnected. In FIG. 4B, the first and second housing portions 33 and 34 are shown connected via the mating of mating features 37 and 38 with mating features 41 and 42, respectively. The first and second housing portions 33 and 34 are connected by pressing them into contact with one another as shown in FIG. 4B until the mating features 37 and 38 are mated with the mating features 41 and 42, respectively. When the first and second housing portions 33 and 34 are connected in this manner, the bend is formed in portion 22c of the fiber 22, which is disposed within the cavity 35.

As indicated above, the portion 22c of the core 22a is unjacketed. The portion of the jacket 22b that previously surrounded the portion 22c is removed prior to installing the optical fiber 22 in the optical connector 30. This may be accomplished by using a tool to completely remove the portion of the jacket 22b that surrounds the portion 22c or by slicing through the jacket 22b and then peeling it back to expose the portion 22c.

As with the embodiment described above with reference to FIGS. 2A and 2B, if the pistoning effect starts to occur, the unjacketed, bent portion 22c of the core 22a that is disposed within the cavity 35 will straighten to remove the bend. This straightening, or at least partial straightening, of the core 22a causes the end 22d of the fiber 22 to remain flush with the end 44 of the ferrule 32, which prevents the gap 7 shown in FIG. 1B from forming. The straightening may be complete or partial depending on the extent of the pistoning effect.

Figure 5A:
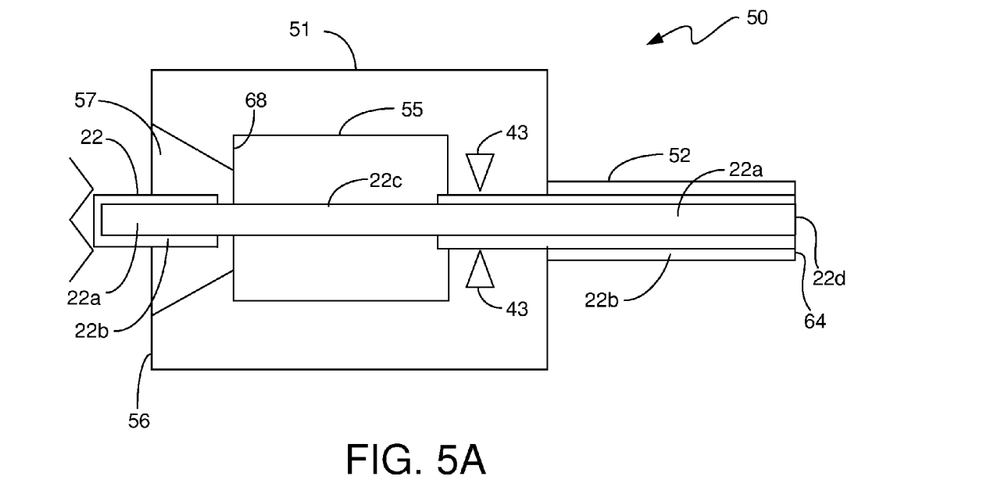
FIGS. 5A and 5B illustrate side cross-sectional views of the optical connector in accordance with another illustrative embodiment having a configuration that forms the bend in the optical fiber when the optical connector is assembled.
Figure 5B:
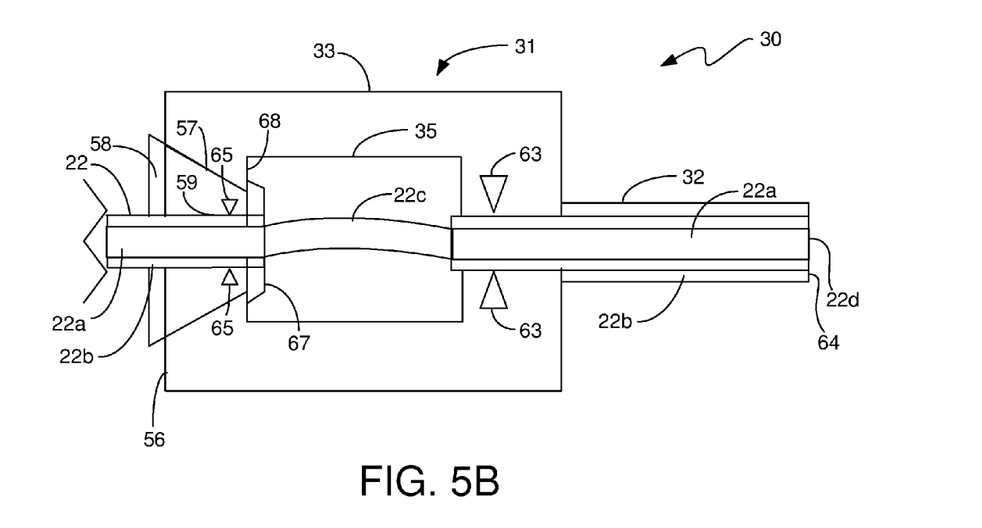

FIGS. 5A and 5B illustrate side cross-sectional views of the optical connector 50 in accordance with an illustrative embodiment having a configuration that forms the bent portion 22c when the optical connector 50 is fully assembled. In FIG. 5A, the optical connector 50 is shown in a pre-assembled state. In FIG. 5B, the optical connector 50 is shown in a fully-assembled state. The optical connector 50 has a connector housing 51 and a ferrule 52. A cavity 55 exists in the connector housing 51. An end 56 of the connector housing 51 that is opposite the ferrule 52 has an opening 57 that is configured to mate with a plug 58 (FIG. 5B).

The optical fiber 22 passes through an opening 59 formed in the plug 58 and through the connector housing 51. The fiber 22 is secured to the connector housing 51 by clamps 63 such that the end 22d of the fiber 22 is substantially flush with an end 64 of the ferrule 52. The fiber 22 is secured to the plug 58 by a clamping mechanism 65. The plug 58 is typically made of a resilient material, such as rubber or plastic, for example. The opening 59 in the plug 58 through which the fiber 22 passes typically has a diameter that is slightly smaller than the diameter of the fiber 22 such that the clamping mechanism 65 corresponds to inwardly directed forces exerted by the plug 58 on the portion of the fiber 22 that is disposed within the opening 59. When the plug 58 is mated with the opening 57, a circumferential latch feature 67 latches the plug 58 to a wall 68 of the cavity 55, as shown in FIG. 5B. In this fully-assembled state, the bend exists in the portion 22c of the fiber 22 that is disposed within the cavity 55.

As with the embodiments described above with reference to FIGS. 2A, 2B, 4A, and 4B, if the pistoning effect starts to occur, the unjacketed, bent portion 22c of the core 22a that is disposed within the cavity 55 will straighten, at least partially. This complete or partial straightening of the core 22a causes the end 22d of the fiber 22 to remain flush with the end 64 of the ferrule 52, which prevents the gap 7 shown in FIG. 1B from forming.

Figure 6A:
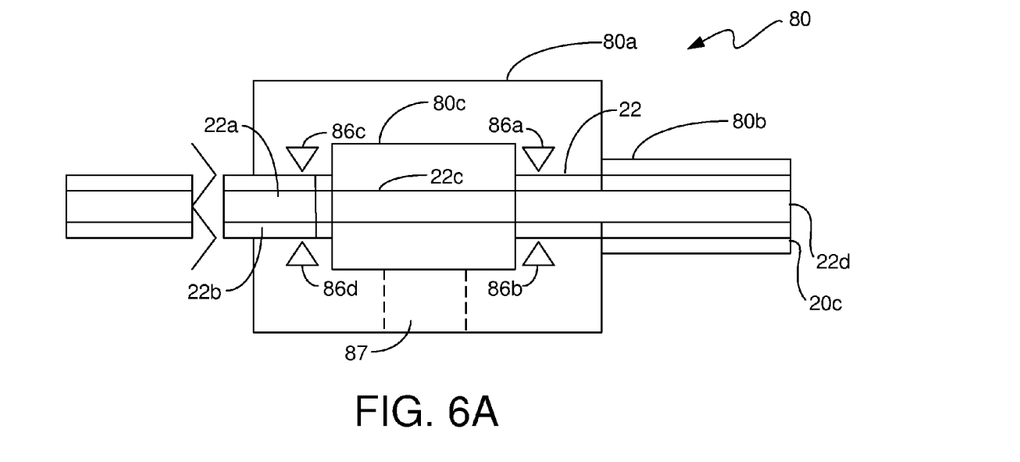
FIGS. 6A and 6B illustrate side views of an illustrative embodiment of the optical connector coupled with an optical fiber that demonstrate the manner in which a portion of the fiber disposed within the connector may be bent.
Figure 6B:
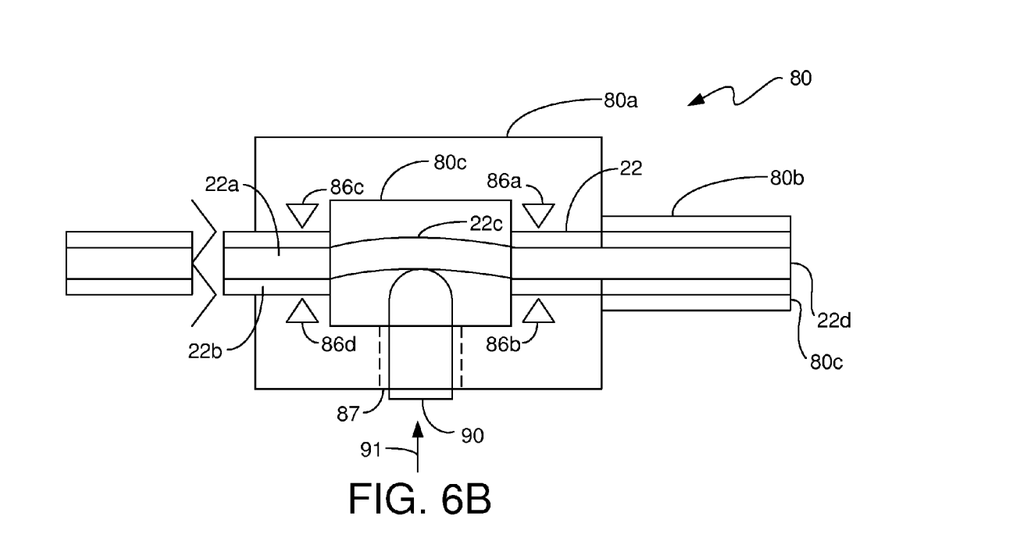

FIGS. 6A and 6B illustrate side views of an illustrative embodiment of the optical connector 80 coupled with an optical fiber 22 and demonstrate the manner in which the portion 22c of the fiber 22 may be bent. The optical connector 80 is very similar in construction to the optical connector 20 shown in FIGS. 2A and 2B. The main difference between the optical connectors 20 and 80 is that optical connector 80 has an opening 87 therein through which a device 90 may be inserted to form the bend in portion 22c of the core 22a of the fiber 22. The optical connector 80 includes a connector housing 80a and a ferrule 80b. The connector housing 80a has a cavity 80c formed therein in which portion 22c of the core 22a is disposed. The end 22d of the fiber 22 is flush with an end 80d of the ferrule 80b. The end 22d of the fiber 22 is made flush with the end 80d of the ferrule 80b via a known polishing process or similar process.

Clamps 86a-86d are used to clamp the fiber 22 in position within the connector housing 20a. However, prior to the portion 22c of the fiber 22 being bent, as shown in FIG. 6A, only clamps 86a and 86b are in their active states in which they clamp the fiber 22 in position. Clamps 86c and 86d are not placed in their active states until after the portion 22c of the fiber 22 has been bent, as shown in FIG. 6B, and the device 90 has been removed from the opening 87 formed in the connector housing 80a.

In order to form the bend in portion 22c of the core 22a of the fiber 22, the device 90 is inserted into the opening 87 in the direction indicated by arrow 91 and pressed against the portion 22c of the core 22a of the fiber 22, as shown in FIG. 6B. After the portion 22c has been bent by the desired amount, the device 90 is removed from the opening 87 by pulling the device 90 in a direction that is opposite the direction indicated by arrow 91.

If the pistoning effect starts to occur after the bend has been formed in portion 22c of core 22a of fiber 22, the bent portion 22c will straighten to remove the bend. As indicated above with reference to FIGS. 2A, 2B and 4A-5B, this straightening of the core 22a causes the end 22d of the fiber 22 to remain flush with the end 80d of the ferrule 80b, which prevents the gap 7 shown in FIG. 1B from forming. In this way, optical losses due to the pistoning effect are prevented. As indicated above, this feature reduces costs associated with the optical link while improving the performance of the optical link.

Figure 7A:
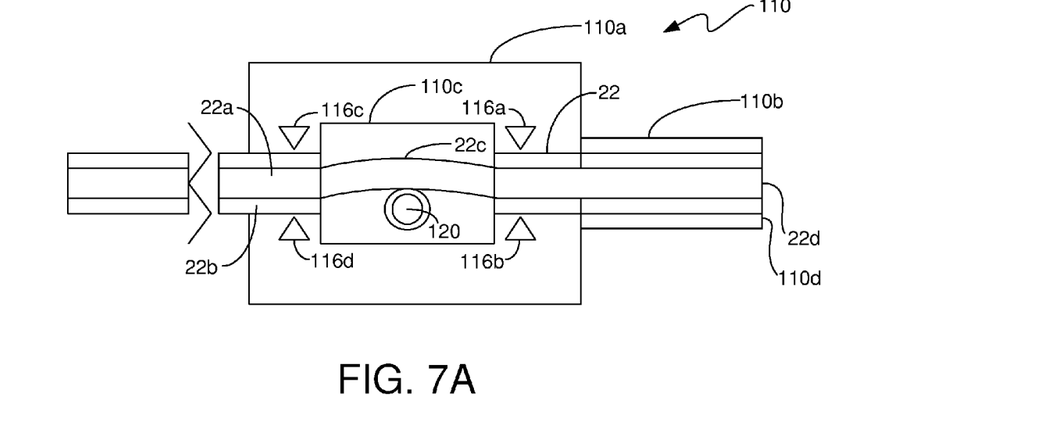
FIG. 7A illustrates a side cross-sectional view of an illustrative embodiment of the optical connector coupled with an optical fiber and having a device for forming a bend in a portion of the fiber.
Figure 7B:
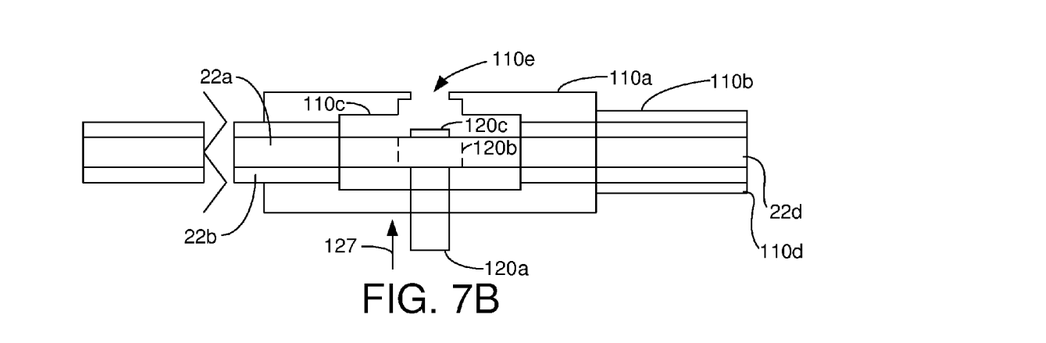
FIGS. 7B and 7C illustrate top cross-sectional views of the optical connector shown in FIG. 7A during and after the process of bending a portion of the optical fiber has been performed, respectively.
Figure 7C:
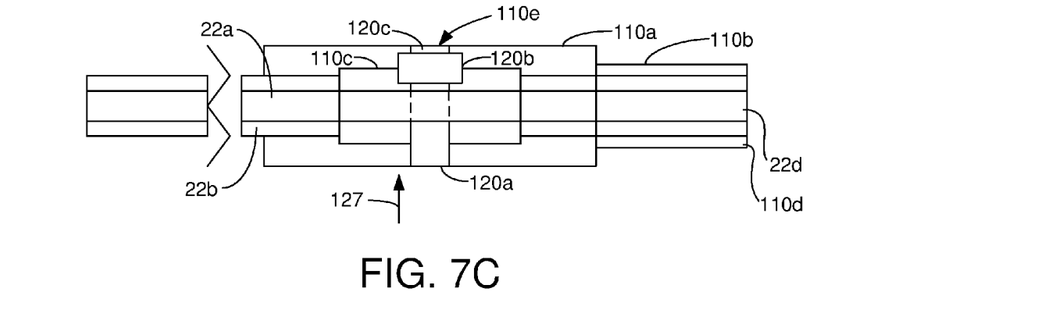

FIG. 7A illustrates a side cross-sectional view of an illustrative embodiment of the optical connector 110 coupled with the optical fiber 22 and having a device 120 for forming the bend in portion 22c of the core 22a of the fiber 22. FIGS. 7B and 7C illustrate top cross-sectional views of the optical connector 110 shown in FIG. 7A during and after the process of bending portion 22c has been performed, respectively. The optical connector 110 is very similar in construction to the optical connector 80 shown in FIGS. 6A and 6B. The main difference between the optical connectors 80 and 110 is that optical connector 110 is equipped with the device 120 for bending the core 22a.

The optical connector 110 includes a connector housing 110a and a ferrule 110b. The connector housing 110a has a cavity 110c formed therein in which portion 22c of the core 22a is disposed. The end 22d of the fiber 22 is flush with an end 110d of ferrule 110b. The end 22d of the fiber 22 is made flush with the end 110d of the ferrule 110b via a known polishing process or similar process. Clamps 116a-116d (visible only in FIG. 7A) are used to clamp the fiber 22 in position within the connector housing 110a. However, prior to the portion 22c of the fiber 22 being bent, only clamps 116a and 116b are in their active clamping states. Clamps 116c and 116d are not placed in their active clamping states until after the portion 22c of the fiber 22 has been bent.

In FIG. 7A, it can be seen that the device 120 has a circular cross-section, although the device 120 may have other shapes. With reference to FIG. 7B, the bend is formed by asserting a force against a proximal end 120a of the device 120 in the direction indicated by arrow 127 until an outer portion 120b of the device 120 presses against the portion 22c of the fiber core 22a to form the bend. Once the bend has been formed, continued motion of the device 120 in the direction indicated by arrow 127 will move the device 120 into a storage position within the connector housing 110a, as shown in FIG. 7C. The connector housing 110a has an opening 110e formed in it that is complementary in shape to the combined shape of outer portion 120b and distal end 120c of the device 120. When the device 120 is in the storage position shown in FIG. 7C, outer portion 120b and distal end 120c are engaged with the opening 110e.

The invention is not limited to the embodiments of the devices or methods described herein for forming the bend in portion 22c of core 22a of fiber 22. As will be understood by persons of skill in the art in view of the description being provided herein, the bend may be formed in virtually an infinite number of ways using virtually an infinite number of different devices. The process of forming the bend in portion 22c may be a manual process or an automated process. Also, the invention is not limited to using any particular connector configuration or any particular type of optical fiber. The embodiments described above with reference to the FIGS. 2A-7C are intended to demonstrate the principles and concepts of the invention, but are not intended to limit the invention.

It should be noted that the invention has been described with respect to illustrative embodiments for the purpose of describing the principles and concepts of the invention. The invention is not limited to these embodiments. As will be understood by those skilled in the art in view of the description being provided herein, many modifications may be made to the embodiments described herein while still achieving the goals of the invention, and all such modifications are within the scope of the invention.

What is claimed is:

1. An optical connector comprising:
 a connector housing having at least a first end, a second end, and a ferrule, the ferrule having a first end that is secured to the second end of the connector housing, and wherein a cavity is located in the connector housing between the first and second ends of the connector housing; and
 an optical fiber having a first end that is disposed within the ferrule and located proximate the second end of the ferrule, the optical fiber having a core and at least one jacket, the jacket surrounding the core, and wherein a portion of the optical fiber is disposed within the cavity, the portion of the optical fiber that is disposed within the cavity having the jacket removed and being bent by a predetermined amount to have a predetermined bend radius within the cavity.

2. The optical connector of claim 1, wherein the bent portion of the optical fiber that is disposed within the cavity prevents or limits pistoning that would otherwise cause the first end of the optical fiber to retract away from the second end of the ferrule.

3. The optical connector of claim 1, wherein the bent portion of the optical fiber that is disposed within the cavity prevents or limits pistoning by fully or at least partially straightening if pistoning starts to occur to maintain the first end of the optical fiber proximate the second end of the ferrule.

4. The optical connector of claim 1, wherein the connector housing comprises at least first and second housing portions, the cavity being disposed in the first housing portion, the second housing portion being secured to a portion of the optical fiber, the first and second housing portions having mating features thereon, and wherein the mating features on the first housing portion engage the mating features on the second housing portion when the first and second housing portions are connected together, and wherein connecting the first and second housing portions together forms the bend in the portion of the optical fiber disposed within the cavity.

5. The optical connector of claim 1, further comprising:
 a plug, wherein the connector housing has an opening formed in the second end thereof that is adapted to receive the plug, wherein a portion of the optical fiber passes through an opening formed in the plug into the connector housing, the portion of the optical fiber passing through the plug being clamped to the plug, and wherein plugging the plug into the opening formed in the second end of the connector housing forms the bend in the portion of the optical fiber disposed within the cavity.

6. The optical connector of claim 1, wherein the connector housing has an opening formed in a side thereof that extends into the cavity, the opening being sized to allow a device to be inserted through the connector housing into the cavity and pressed against the portion of the optical fiber disposed in the cavity in order to form the bend in the portion of the optical fiber disposed within the cavity.

7. The optical connector of claim 1, further comprising:
 a device disposed within an opening formed in a side of the connector housing and extending into the cavity, the device having a proximal end and a distal end, the device being movable within the opening formed in the side of the connector housing in at least one direction that is generally perpendicular to an optical axis of the optical fiber to cause the distal end of the device to press against the portion of the optical fiber disposed in the cavity, and wherein the pressing of the distal end of the device against the portion of the optical fiber disposed within the cavity forms the bend.

8. The optical connector of claim 7, wherein the device is removable from the connector housing.

9. The optical connector of claim 7, wherein the device is fixedly securable to the connector housing.

10. A method for preventing or limiting pistoning of a core of an optical fiber disposed within a ferrule of an optical connector, the method comprising:
 providing a connector housing having at least a first end, a second end, and a ferrule, the ferrule having a first end that is secured to the second end of the connector housing, and wherein a cavity is located in the connector housing between the first and second ends of the connector housing;
 providing an optical fiber having a first end that is disposed within the ferrule and located proximate the second end of the ferrule, the optical fiber having a core and a jacket, the jacket surrounding the core, and wherein a portion of the optical fiber is disposed within the cavity, the portion of the optical fiber that is disposed within the cavity having the jacket removed; and
 bending the portion of the optical fiber disposed within the cavity by a predetermined amount to have a predetermined bend radius within the cavity.

11. The method of claim 10, wherein the bent portion of the optical fiber that is disposed within the cavity prevents or limits pistoning that would otherwise cause the first end of the optical fiber to retract away from the second end of the ferrule.

12. The method of claim 10, wherein the bent portion of the optical fiber that is disposed within the cavity prevents or limits pistoning by fully or partially straightening if pistoning starts to occur to maintain the first end of the optical fiber proximate the second end of the ferrule.

13. The method of claim 10, wherein the connector housing comprises at least first and second housing portions, the cavity being disposed in the first housing portion, the second housing portion being secured to a portion of the optical fiber, the first and second housing portions having mating features thereon, and wherein the mating features on the first housing portion engage the mating features on the second housing portion when the first and second housing portions are connected together, and wherein the bending of the portion of the optical fiber disposed within the cavity is performed by connecting the first and second housing portions together.

14. The method of claim 10, further comprising:
 providing a plug, and wherein the connector housing has an opening formed in the second end thereof that is adapted to receive the plug, and wherein a portion of the optical fiber passes through an opening formed in the plug into the connector housing, the portion of the optical fiber passing through the plug being clamped to the plug, and wherein the bending of the portion of the optical fiber disposed within the cavity is performed by plugging the plug into the opening formed in the second end of the connector housing.

15. The method of claim 10, wherein the connector housing has an opening formed in a side thereof that extends into the cavity, the opening being sized to allow a device to be inserted through the connector housing into the cavity, the method further comprising:
 inserting a device through the opening formed in the side of the connector housing such that a distal end of the device extends into the cavity and presses against the portion of the optical fiber disposed in the cavity, wherein the pressing of the distal end of the device against the portion of the optical fiber forms the bend in the portion of the optical fiber disposed within the cavity.

16. The method of claim 15, wherein said inserting is performed by a machine in an automated process.

17. The method of claim 15, wherein said inserting is performed manually by a person.

18. The method of claim 10, wherein the connector housing has a device disposed within an opening formed in a side of the connector housing and extending into the cavity, the device having a proximal end and a distal end, the device being movable within the opening formed in the side of the connector housing in at least one direction that is generally perpendicular to an optical axis of the optical fiber, the method further comprising:

actuating the device to cause the distal end of the device to press against the portion of the optical fiber disposed in the cavity, and wherein the pressing of the distal end of the device against the portion of the optical fiber disposed within the cavity forms the bend.

19. The method of claim 18, wherein said actuating is performed by a machine in an automated process.

20. The method of claim 18, wherein said actuating is performed manually by a person.

* * * * *